United States Patent
Horii et al.

(10) Patent No.: US 11,014,558 B2
(45) Date of Patent: May 25, 2021

(54) VEHICLE CONTROL APPARATUS

(71) Applicant: HONDA MOTOR CO., LTD., Tokyo (JP)

(72) Inventors: Hiroaki Horii, Wako (JP); Tadahiko Kanoh, Wako (JP); Jun Ochida, Wako (JP); Hirofumi Kanazaki, Wako (JP); Luwei Jia, Wako (JP); Nobuharu Nagaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 16/276,088

(22) Filed: Feb. 14, 2019

(65) Prior Publication Data

US 2019/0256093 A1  Aug. 22, 2019

(30) Foreign Application Priority Data

Feb. 16, 2018 (JP) .............................. JP2018-026272

(51) Int. Cl.
*B60W 30/16* (2020.01)
*B60W 30/17* (2020.01)
*G05D 1/02* (2020.01)

(52) U.S. Cl.
CPC .......... *B60W 30/162* (2013.01); *B60W 30/17* (2013.01); *G05D 1/0223* (2013.01); *B60W 2554/4041* (2020.02); *B60W 2554/804* (2020.02); *G05D 2201/0213* (2013.01)

(58) Field of Classification Search
CPC ............... B60W 30/162; B60W 30/17; B60W 2554/804; B60W 2554/4041; B60W 2050/0095; B60W 50/023; B60W 30/143; B60W 30/16; B60W 2050/0215; B60W 2050/0292; B60W 30/18; B60W 40/105; G05D 1/0223; G05D 2201/0213
See application file for complete search history.

(56) References Cited

U.S. PATENT DOCUMENTS

2019/0016345 A1* 1/2019 Kitagawa .............. B60W 40/09

FOREIGN PATENT DOCUMENTS

JP    2012-066777 A    4/2012
JP    2015024746 A *   2/2015

OTHER PUBLICATIONS

English Translation_JP2015024746A (Year: 2015).*

* cited by examiner

*Primary Examiner* — Peter D Nolan
*Assistant Examiner* — Ashley L Redhead, Jr.
(74) *Attorney, Agent, or Firm* — Carrier Blackman & Associates, P.C.; Joseph P. Currier; Jeffrey T. Gedeon (57) ABSTRACT

Even in the case that a learning flag and an ACC permission flag are not set, if a power switch is in an ON state, a travel control of a second control state, which is capable of being executed in a setting in which an inter-vehicle distance setting is a short setting or a host vehicle velocity setting is a low setting, is carried out.

14 Claims, 7 Drawing Sheets

|  | ACC CONTROL HAVING A TRAFFIC JAM FOLLOW-UP FUNCTION (FIRST CONTROL STATE) | TRAFFIC JAM FOLLOW-UP FUNCTION CONTROL (SECOND CONTROL STATE) |
|---|---|---|
| INTER-VEHICLE DISTANCE SETTING | MINIMUM TO MAXIMUM | MINIMUM |
| HOST VEHICLE VELOCITY SETTING | HIGH VEHICLE VELOCITY | LOW VEHICLE VELOCITY |

FIG. 5A (MODIFICATION 1)

| ACC/TJA SWITCH | Fys | Fgs | ACC FUNCTION CONTROL | TJA FUNCTION CONTROL |
|---|---|---|---|---|
| OFF | 0 | 0 | NG | NG |
| OFF | 0 | 1 | NG | NG |
| OFF | 1 | 0 | NG | NG |
| OFF | 1 | 1 | NG | NG |
| ON | 0 | 0 | NG | OK |
| ON | 0 | 1 | NG | OK |
| ON | 1 | 0 | NG | OK |
| ON | 1 | 1 | OK | OK |

FIG. 5B (MODIFICATION 2)

| ACC SWITCH | TJA SWITCH | Fys | ACC FUNCTION CONTROL | TJA FUNCTION CONTROL |
|---|---|---|---|---|
| OFF | OFF | 0 | NG | NG |
| OFF | OFF | 1 | NG | NG |
| OFF | ON | 0 | NG | OK |
| OFF | ON | 1 | NG | OK |
| ON | OFF | 0 | NG | NG |
| ON | OFF | 1 | OK | NG |
| ON | ON | 0 | NG | OK |
| ON | ON | 1 | OK | OK |

VEHICLE CONTROL APPARATUS

CROSS-REFERENCE TO RELATED APPLICATION

This application is based upon and claims the benefit of priority from Japanese Patent Application No. 2018-026272 filed on Feb. 16, 2018, the contents of which are incorporated herein by reference.

BACKGROUND OF THE INVENTION

Field of the Invention

The present invention relates to a vehicle control apparatus adapted to perform a travel control in a manner so that a host vehicle conforms to external environmental information acquired by external environment sensors, on the basis of behaviors of the host vehicle detected by vehicle sensors.

Description of the Related Art

In the application of Japanese Laid-Open Patent Publication No. 2012-066777 (hereinafter referred to as JPA 2012-066777), there is disclosed a vehicle travel control device in which a vehicle velocity, a yaw rate, and objects in front of a host vehicle are detected, and in the event there is a preceding vehicle traveling at a high velocity, the vehicle control apparatus performs an ACC control that controls following in a manner so that an inter-vehicular distance with the preceding vehicle becomes a target inter-vehicular distance (see paragraph [0028] of JPA 2012-066777).

Further, a vehicle travel control device is also proposed that carries out a TJA (Traffic Jam Assist) control in which the vehicle velocity, the yaw rate, and objects in front of the host vehicle are detected, and either stops or commences with traveling by following the preceding vehicle which stops or travels at a low velocity at the time of a traffic jam.

SUMMARY OF THE INVENTION

Incidentally, a zero point of the yaw rate sensor utilized in the vehicle control apparatus undergoes shifting due to changes in the environmental conditions such as temperature or the like, and due to changes over time.

Therefore, in JPA 2012-066777, it is disclosed that a so-called zero point learning technique is performed, in which the zero point is corrected when the ignition is turned on and when the host vehicle is stopped in a stable manner, and further, in the case that the zero point learning process is completed, a completion flag is set, and the ACC control is performed (see paragraphs [0079], [0094], [0095], and [0102] of JPA 2012-066777).

Moreover, it is disclosed that, normally, in the case that the zero point learning process is incomplete or if an abnormality occurs in the yaw rate sensor, the function of the ACC control is loosened or is prohibited (see paragraph of JPA 2012-066777).

The present invention has been devised taking into consideration the aforementioned problems, and has the object of providing a vehicle control apparatus in which, even in the case that the detection accuracy of a vehicle sensor which is used to detect a behavior of a vehicle becomes less than a predetermined accuracy, it is possible to prevent an excessive restriction of functionality, and to permit a certain vehicle control (a vehicle automated driving control) to continue.

A vehicle control apparatus according to the present invention comprises a vehicle sensor adapted to detect a behavior of a host vehicle, an external environment sensor adapted to acquire external environmental information around a periphery of the host vehicle, and a travel control device adapted to control traveling of the host vehicle in a first control state and a second control state, in a manner so that the host vehicle conforms to the external environmental information on the basis of a behavior of the host vehicle, wherein, in the case that a detection accuracy of the vehicle sensor is less than a predetermined accuracy, the travel control device suppresses the travel control in the first control state, and permits the travel control in the second control state.

According to the present invention, in the case that the detection accuracy of the vehicle sensor that detects the behavior of the vehicle is less than a predetermined accuracy, for example, in the case it is determined that the vehicle sensor has not undergone learning, or in the case that the detection accuracy cannot be confirmed, the travel control in the first control state is suppressed, and the travel control in the second control state is permitted, and therefore, it is possible to perform the travel control within a certain range corresponding to the second control state. Accordingly, an excessive restriction of functionality is prevented, and the merchantability of the vehicle in which the vehicle control apparatus is incorporated is improved.

In this case, the travel control in the second control state is performed by limiting an inter-vehicle distance setting with a preceding vehicle to a short setting, or by limiting a host vehicle velocity setting to a low setting, in comparison with the travel control in the first control state. Therefore, it is possible to perform the travel control in the second control state, which is capable of being executed with these settings.

Moreover, in the case it is detected that a detection accuracy of the vehicle sensor is greater than or equal to a predetermined accuracy, the travel control device preferably cancels suppression of the travel control in the first control state.

As soon as it is detected that the detection accuracy of the vehicle sensor is greater than or equal to a predetermined accuracy, for example, as soon as learning by the vehicle sensor has been completed, the travel control in the first control state is enabled, and therefore, it is possible to smoothly switch from the travel control in the second control state to the travel control in the first control state.

In this instance, the vehicle sensor is constituted by a first vehicle sensor and a second vehicle sensor which are capable of detecting at least one of the same behaviors, and further, in the case it is detected that a detection accuracy of either one of the first vehicle sensor or the second vehicle sensor is less than a predetermined accuracy, the travel control device suppresses the travel control in the first control state, and in the case that the detection accuracy of both the first vehicle sensor and the second vehicle sensor is greater than or equal to a predetermined accuracy, the travel control device permits traveling in the first control state.

In this manner, if the vehicle sensors are designed redundantly, and in the case that the detection accuracy of either one of the first vehicle sensor or the second vehicle sensor is less than a predetermined accuracy, for example, when one of the vehicle sensors has not undergone learning, the travel control in the first control state is suppressed, and in the case that both of the detection accuracies are greater than or equal to the predetermined accuracy, for example, when both of the vehicle sensors have undergone learning, the travel control in the first control state is permitted. Therefore, during traveling of the vehicle, the vehicle sensors are excellent in terms of adaptability.

Further, the vehicle sensor may be constituted by a first vehicle sensor and a second vehicle sensor which are capable of detecting at least one of the same behaviors, and in the case it is detected that a detection accuracy of either one of the first vehicle sensor or the second vehicle sensor is greater than or equal to a predetermined accuracy, the travel control device may make use of a remaining one of the vehicle sensors whose detection accuracy is unknown, using the detection value of the vehicle sensor whose detection accuracy was detected to be greater than or equal to the predetermined accuracy.

In this manner, in the case it is detected that the detection accuracy of either one of the first vehicle sensor or the second vehicle sensor, which are capable of detecting at least one of the same behaviors, is equal to or greater than a predetermined accuracy, the remaining one of the vehicle sensors whose detection accuracy is unknown can be utilized by using the detection value of the vehicle sensor whose detection accuracy was detected to be greater than or equal to the predetermined accuracy, whereby it becomes possible to suppress an excessive restriction of functionality of the vehicle sensors.

The vehicle control apparatus may further comprise a first switch adapted to switch the first control state to an active state or a suppressed state, and a second switch adapted to switch the second control state to an active state or a suppressed state, wherein, in the case it is determined that the vehicle sensor has not undergone learning, the travel control device may invalidate a switching operation of the first switch, may validate a switching operation of the second switch, and may permit only the travel control in the second control state.

In this manner, in the case it is determined that the vehicle sensor has not undergone learning, the switching operation of the first switch that switches between activation and suppression of the first control state is invalidated, the switching operation of the second switch that switches between activation and suppression of the second control state is validated, and only the travel control in the second control state is permitted, and thus, an HMI (human machine interface) property with respect to the user is enhanced.

The vehicle control apparatus may further comprise a dual purpose switch adapted to switch the first and second control states to an active state or a suppressed state, wherein, in the case it is determined that the dual purpose switch has been switch to the active state, and when it is determined that a detection accuracy of the vehicle sensor is less than a predetermined accuracy, the travel control device suppresses the travel control in the first control state, and permits the travel control in the second control state.

In accordance with such an invention, in the case that the dual purpose switch is switched to the active state, and when it is judged that the detection accuracy of the vehicle sensor is less than a predetermined accuracy, for example, when it is determined that the vehicle sensor has not undergone learning, since the travel control in the first control state is suppressed, whereas the travel control in the second control state is permitted, an HMI property with respect to a vehicle occupant such as the driver or the like is enhanced.

According to the present invention, in the case that the detection accuracy of the vehicle sensor that detects the behavior of the vehicle is less than a predetermined accuracy, for example, in the case it is determined that the vehicle sensor has not undergone learning, the travel control in the first control state is suppressed, and the travel control in the second control state is permitted, and therefore, it is possible to perform the travel control within a certain range corresponding to the second control state. Accordingly, an excessive restriction of functionality is prevented, and the merchantability of the vehicle in which the vehicle control apparatus is incorporated is improved.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a vehicle control apparatus according to the present invention will be presented and described in detail below with reference to the accompanying drawings.

Configuration

Figure 1:
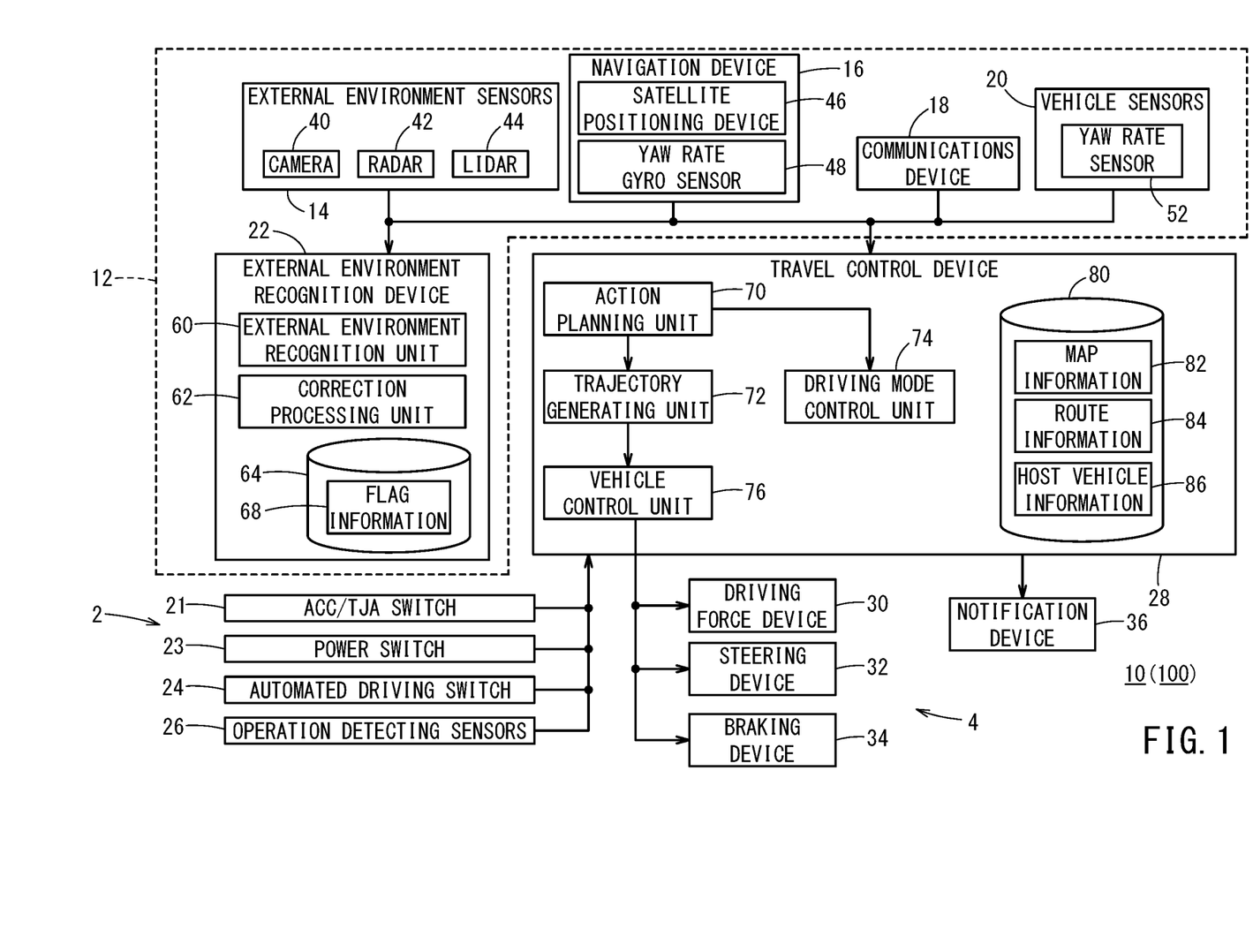
FIG. 1 is a block diagram showing a configuration of a vehicle equipped with a vehicle control apparatus according to an embodiment of the present invention.

FIG. 1 shows a configuration of a vehicle control apparatus 10 which is incorporated in a vehicle 100 according to an embodiment of the present invention.

As shown in FIG. 1, the vehicle control apparatus 10 is incorporated in the vehicle 100, and implements a travel control for the vehicle 100 by way of automated driving or manual driving. In this instance, the term "automated driving" as used herein implies a concept that includes not only "fully automated driving" in which the travel control for the vehicle 100 is performed entirely automatically, but also "partial automated driving" or "driving assistance" in which the travel control is partially performed automatically.

The vehicle control apparatus 10 is basically made up from an input system device group 2, an external environment recognition device 22, a travel control device 28, and an output system device group 4. The respective devices of the input system device group 2 and the output system device group 4 are connected via communication lines to the external environment recognition device 22 and/or the travel control device 28. Further, the external environment recognition device 22 and the travel control device 28 are connected to each other via a communication line.

The input system device group 2 comprises external environment sensors 14, a navigation device 16, a communications device 18, vehicle sensors 20, an ACC switch 21 (also referred to as an ACC/TJA switch) having a traffic jam follow-up function, a power switch 23, an automated driving switch 24, and operation detecting sensors 26 connected to operating devices (not shown). The output system device group 4 comprises a driving force device 30 for driving the vehicle wheels (not shown), a steering device 32 for steering the vehicle wheels, a braking device 34 for braking the vehicle wheels, and a notification device 36 for notifying the driver primarily through visual, auditory, and tactile sensation.

Portions of the input devices (the external environment sensors 14, the navigation device 16, the communications device 18, and the vehicle sensors 20) and the external environment recognition device 22 constitute an external environment recognition system 12.

The external environment sensors 14 acquire information (hereinafter referred to as external environmental information) indicative of the state of the external environment around the vehicle 100, and output external environmental information to the external environment recognition device 22. More specifically, the external environment sensors 14 are configured to include one or more cameras 40, one or more radar devices 42, and one or more LIDAR (Light Detection and Ranging; Laser Imaging Detection and Ranging) devices 44.

The navigation device 16 is configured to include a satellite positioning device 46, a yaw rate gyro sensor 48, and a non-illustrated user interface (for example, a touch panel display, a speaker, and a microphone). The navigation device 16, using detected information from the satellite positioning device 46, etc., measures the current position (travel position) of the vehicle 100, and generates a travel route from such a position to a destination point designated by the user. Moreover, when the satellite positioning device 46 cannot be used during traveling through a tunnel or the like, the travel route is generated by inertial navigation using detected information of the yaw rate gyro sensor 48.

The communications device 18 is configured to be capable of communicating with external devices including roadside devices, other vehicles, and a server, and transmits and receives, for example, information related to traffic facilities (traffic signals, etc.), information related to other vehicles, probe information, or the most recent map information 82. Each of such information is output to the external environment recognition device 22 or the travel control device 28.

The vehicle sensors 20 also include, in addition to a yaw rate sensor 52 which detects an angular velocity about a vertical axis, other non-illustrated sensors including, for example, a velocity sensor for detecting a vehicle velocity (vehicle speed) V, an acceleration sensor for detecting an acceleration, a lateral G sensor for detecting a lateral G force, an azimuth sensor for detecting a direction and orientation, and a gradient sensor for detecting a gradient. Signals detected by the respective sensors are output to the external environment recognition device 22 and/or the travel control device 28, and are stored in respective memories 64 and 80 as host vehicle (user's own vehicle) information 86.

It should be noted that the yaw rate sensor 52 is used in connection with a VSA (Vehicle Stability Assist) control or the like for stabilizing the behavior of the vehicle 100 during cornering or the like.

The automated driving switch 24, for example, is a button switch provided on the steering wheel or an instrument panel or the like. The automated driving switch 24 is configured to be capable of switching between a plurality of driving modes, by manual operation thereof by a user including the driver. The automated driving switch 24 outputs a mode switching signal to the travel control device 28.

The operation detecting sensors 26 detect the presence or absence of operations by the driver, operation amounts, and operation positions with respect to various non-illustrated operation devices such as an accelerator pedal, a steering wheel, a brake pedal, a shift lever, and a direction indicating lever. The operation detecting sensors 26 output as detection results to the travel control device 28 an accelerator pedal depression amount (accelerator degree of opening), a steering operation amount (steering amount), a brake pedal depression amount, a shift position, and a right or left turning direction, etc.

The ACC/TJA switch 21, for example, is a button switch provided on the steering wheel or an instrument panel or the like. When the ACC/TJA switch 21 is operated, the vehicle 100, in addition to undergoing constant velocity traveling at a preset velocity by the ACC function, upon approaching a preceding vehicle, the cameras 40 and the radar devices 42 measure a distance and a difference in velocity between the vehicle 100 and the preceding vehicle, and automatically accelerates or decelerates to thereby travel in a following manner (perform follow-on traveling) while maintaining an appropriate inter-vehicle distance. Further, by way of the traffic jam follow-up function, the vehicle 100 automatically stops when the preceding vehicle stops, and resumes follow-on traveling by an operation of the driver if the preceding vehicle starts traveling again. Moreover, in the case of automated driving, the vehicle 100 automatically resumes follow-on traveling (TJP: Traffic Jam Pilot) if the preceding vehicle starts traveling again.

The power switch 23, for example, is a button switch provided on the instrument panel or the like. When the power switch 23 is operated, electrical power from a non-illustrated battery is supplied to the vehicle 100, and when operated again, the supply of electrical power to the vehicle 100 is stopped.

The driving force device 30 is constituted from a driving force ECU (Electronic Control Unit), and a drive source including an engine and/or a driving motor. The driving force device 30 generates a travel driving force (torque) for the vehicle 100 in accordance with vehicle control values output from a vehicle control unit 76, and transmits the travel driving force to the vehicle wheels directly or through a transmission.

The steering device 32 is constituted from an EPS (electric power steering system) ECU, and an EPS actuator. The steering device 32 changes the orientation of the vehicle wheels (steered wheels) in accordance with vehicle control values output from the vehicle control unit 76.

The braking device 34, for example, is an electric servo brake used in combination with a hydraulic brake, and is made up from a brake ECU and a brake actuator. The braking device 34 brakes the vehicle wheels in accordance with vehicle control values output from the vehicle control unit 76.

The notification device 36 is made up from a notification ECU, a display device, an audio device, and a haptic (tactile sensory) device. The notification device 36 carries out a notifying operation to provide a notification in relation to automated driving or manual driving, in accordance with a notification command output from the travel control device 28. When the notifying operation is performed, the notification ECU controls one or more of the display device, the acoustic device, and the haptic device. At this time, the notification ECU may change the device that is operated or the operations thereof per se in accordance with the notified content.

The external environment recognition device 22 is constituted by one or a plurality of ECUs, and comprises the memory 64 and various function realizing units. According to the present embodiment, the function realizing units are software-based functional units, in which the functions thereof are realized by a CPU (central processing unit) executing programs that are stored in the memory 64. Alternatively, the function realizing units may be hardware-based functional units made up from integrated circuits such as field-programmable gate arrays (FPGA) or the like. The function realizing units include an external environment recognition unit 60 and a correction processing unit 62.

The external environment recognition unit 60 recognizes static external environmental information around the periphery of the vehicle 100, and generates external environment recognition information, using the external environmental information acquired by the external environment sensors 14, and the map information of the navigation device 16. Static external environmental information includes recognized objects such as lane markings, stop lines, traffic signals, traffic signs, geographic features (real estate), travel capable regions, evacuation areas, and the like. Using the external environmental information acquired by the external environment sensors 14, and the information received by the communications device 18, the external environment recognition unit 60 recognizes dynamic external environmental information around the periphery of the vehicle 100, and generates external environment recognition information. The dynamic external environmental information includes, for example, obstacles such as parked or stopped vehicles, traffic participants such as pedestrians and other vehicles (including bicycles), etc., and traffic signals (light colors of the traffic signals), and the like. Further, the dynamic external environmental information also includes information on directions of movement of each of the recognized objects. The external environment recognition unit 60 recognizes the position of each recognition target based on the positioning result of the satellite positioning device 46 and the map information of the navigation device 16.

The correction processing unit 62 sets or resets a TJA (Traffic Jam Assist) permission flag Ftja, together with performing zero point learning or the like of the yaw rate gyro sensor 48 and the yaw rate sensor 52, and setting or resetting of a learning flag Fys and an ACC permission flag Facc.

In addition to the various programs, the memory 64 stores flag information 68 and the like, which indicates setting or resetting information of the TJA permission flag Ftja, the learning flag Fys, and the ACC permission flag Facc, which are set or reset by the correction processing unit 62.

Similar to the external environment recognition device 22, the travel control device 28 is constituted by one or a plurality of ECUs, and comprises the memory 80 and various function realizing units. The function realizing units include an action planning unit 70, a trajectory generating unit 72, a driving mode control unit 74, and the vehicle control unit 76.

On the basis of the recognition results from the external environment recognition device 22, the action planning unit 70 creates action plans (a time series of events) for each of respective travel segments, and updates the action plans as needed. As types of events, for example, there may be cited events in relation to deceleration, acceleration, branching, merging, lane keeping, lane changing, and passing other vehicles. In this instance, "deceleration" and "acceleration" are events in which the vehicle 100 is made to decelerate or accelerate. "Branching" and "merging" are events in which the vehicle 100 is made to travel smoothly at a branching point or a merging point. "Lane changing" is an event in which a change is made to the travel lane of the vehicle 100. "Passing" is an event in which a preceding other vehicle is overtaken by the vehicle 100. Further, "lane keeping" is an event in which the vehicle 100 is made to travel without departing from the travel lane, and is subdivided into a combination of travel modes. More specifically, as such travel modes, there may be included constant speed traveling, follow-on traveling, traveling while decelerating, traveling through a curve, or traveling to avoid obstacles.

Using map information 82, route information 84, and host vehicle information 86, which are read out from the memory 80, the trajectory generating unit 72 generates a planned travel trajectory in accordance with the action plan created by the action planning unit 70. The planned travel trajectory is data indicative of a time series of target vehicle behaviors, and more specifically, is a time series data set, in which the data units thereof are defined by a position, a posture angle, a velocity, an acceleration or deceleration, a curvature, a yaw rate, and a steering angle.

In accordance with a signal output from the automated driving switch 24, the driving mode control unit 74 performs a transition process to transition from the manual driving mode to the automated driving mode, or a transition process to transition from the automated driving mode to the manual driving mode. Further, in accordance with signals output from the operation detecting sensors 26, the driving mode control unit 74 performs a transition process to transition from the automated driving mode to the manual driving mode.

The vehicle control unit 76 determines respective vehicle control values in order to control traveling of the vehicle 100, in accordance with the planned travel trajectory generated by the trajectory generating unit 72. In addition, the vehicle control unit 76 outputs the determined vehicle control values, respectively, to the driving force device 30, the steering device 32, and the braking device 34.

Operations

With reference to the flowchart shown in FIG. 2, a description will be given of an example of how TJA traveling and ACC traveling are suppressed or permitted by the vehicle control apparatus 10, which is basically configured in the manner described above.

In step S1, it is determined whether or not the power switch 23 has been shifted from an OFF position to an ON position by an operation of the vehicle occupant, or alternatively, whether or not the power switch 23 is in the ON position.

In the case that the power switch 23 has transitioned from the ON position to the OFF position (step S1: NO), the supply of electrical power from a non-illustrated battery to the vehicle 100 is stopped, and therefore, by the stopping process of step S2, the TJA permission flag Ftja, the learning flag Fys of the yaw rate sensor 52, and the ACC permission flag Facc are all reset (Ftja=0, Fys=0, Facc=0).

On the other hand, in the case that the power switch 23 has transitioned from the OFF position to the ON position (step S1: YES), or in the case of being in the ON position (step S1: YES), the electrical power from the non-illustrated battery is supplied to the vehicle 100, and upon confirming that all of the structural components of the vehicle control apparatus 10 are not malfunctioning and are operating without problems, then in step S3, the TJA permission flag Ftja is set (Ftja=1).

Next, in step S4, on the basis of the vehicle velocity V, a determination is made as to whether the vehicle 100 is stopped (V=0) or not (V≠0) with the power switch 23 being in an ON state.

In the case that the vehicle 100 is stopped with the power switch 23 being in an ON state (step S4: YES), then in step S5, the correction processing unit 62 performs a zero point learning process of the yaw rate sensor 52, and any shifting (offset) of the zero point is corrected.

Since the zero point learning process requires a certain period of time during which a steady state of the vehicle 100 is maintained after the power switch 23 has been turned ON, during the zero point learning process in step S5 (step S5: NO), the determination of step S4 as to whether or not the vehicle 100 is stopped is continued.

If the zero point learning process is completed (step S5: YES), then in step S6, the learning flag Fys is set (Fys=1).

Furthermore, in step S7, the ACC permission flag Facc is set (Facc=1), and the process transitions to step S8.

It should be noted that the processes of steps S6 and S7 are not limited in the order in which they are performed, and the learning flag Fys and the ACC permission flag Facc may be set at the same time.

On the other hand, in the case that the vehicle 100 starts traveling before completion of the zero point learning process of step S5 (step S4: NO), the learning flag Fys and the ACC permission flag Facc are maintained in their reset state (Fys=0, Facc=0), and the process transitions to step S8.

In step S8, a determination is made as to whether or not the ACC/TJA switch 21 has been placed in an ON state, and in the case of being in an ON state (step S8: YES), when the TJA permission flag Ftja and the ACC permission flag Facc (learning flag Fys) are set, the ACC control having a traffic jam follow-up function is executed (step S7→step S8: YES→step S9), and when only the TJA permission flag Ftja is set, the traffic jam follow-up function control is executed (step S3→step S4: NO→step S8: YES→step S9), and thereafter the process returns to step S1.

Moreover, in the case that the ACC/TJA switch 21 is in an active state (ON state) (step S5: YES→step S6→step S7→step S8: YES) at a time that the TJA permission flag Ftja and the ACC permission flag Facc (learning flag Fys) are set, if the velocity of the host vehicle 100 (host vehicle velocity) is less than a predetermined velocity, for example, 30 [km/h], then in step S9, the traffic jam follow-up function control may be automatically executed, whereas if the host vehicle velocity is greater than or equal to 30 [km/h], then in step S9, the ACC control having a traffic jam follow-up function may be automatically executed.

Figure 3:
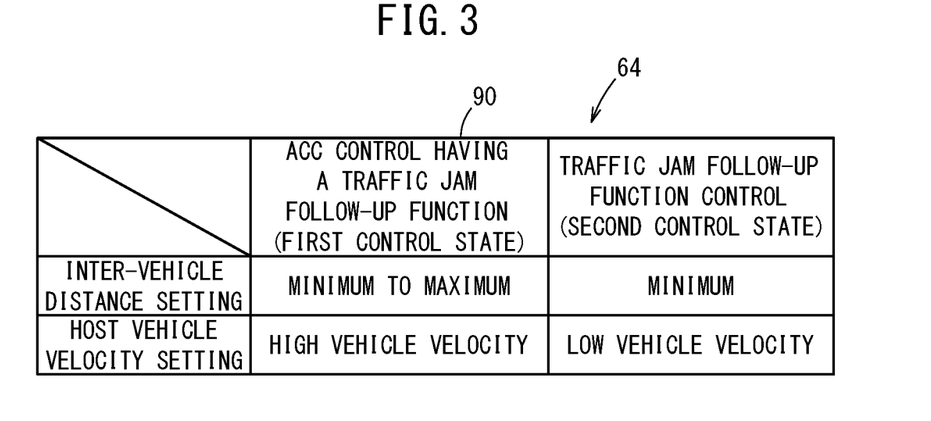
FIG. 3 shows an ACC control having a traffic jam follow-up function stored in a memory, and a setting map of an inter-vehicle distance and a host vehicle velocity of a traffic jam follow-up function control.

FIG. 3 shows a setting map (setting table) for the inter-vehicle distance and the host vehicle velocity, which is stored in the memory 64, in the ACC control having a traffic jam follow-up function (also referred to as a first control state), and in the traffic jam follow-up function control (also referred to as a second control state).

In the ACC control having a traffic jam follow-up function, the inter-vehicle distance setting can be set within a range from a minimum value to a maximum value, and the host vehicle velocity setting can be set to a high vehicle velocity, for example, 30 [km/h] or greater. In the traffic jam follow-up function control, the inter-vehicle distance setting can be set only to a minimum distance setting, and the host vehicle velocity setting can be set to a low vehicle velocity within a range, for example, from 30 [km/h] to 40 [km/h].

Moreover, in the case that the yaw rate sensor 52 could not undergo learning (step S4: NO) in the processes of the previous steps S4 and S5 and even if the learning flag Fys and the ACC permission flag Facc are not set, when, for example, the zero point learning process has been completed in step S5 during automated stopping of the host vehicle 100 in accordance with stoppage of a preceding vehicle during stopping at a red light or while following the preceding vehicle in accordance with the traffic jam follow-up function control, then in steps S6 and S7, the learning flag Fys and the ACC permission flag Facc are set (Fys=1, Facc=1).

In this case, in step S9, the traffic jam follow-up function control transitions to the ACC control having a traffic jam follow-up function.

Summary of the Embodiment

As described above, the vehicle control apparatus 10 according to the present invention comprises the yaw rate sensor 52 (vehicle sensor) adapted to detect a behavior (yaw rate) of the host vehicle 100, the external environment sensors 14 adapted to acquire external environmental information around a periphery of the host vehicle 100, and the travel control device 28 adapted to control traveling of the host vehicle 100 in the first control state (ACC control having a traffic jam follow-up function) and the second control state (traffic jam follow-up function control), in a manner so that the host vehicle 100 conforms to the external environmental information on the basis of the behavior of the host vehicle 100.

In this instance, in the case it is determined that the detection accuracy of the yaw rate sensor 52 (vehicle sensor) is less than a predetermined accuracy, for example, in the case it is determined that the yaw rate sensor 52 has not undergone learning (step S5: NO→step S4: NO) (Fys=0), the travel control device 28 suppresses (Facc=0) the travel control in the first control state (ACC control having a traffic jam follow-up function), and permits (Ftja=1) the travel control in the second control state (traffic jam follow-up function control), and therefore, it is possible to perform the travel control within a certain range corresponding to the second control state (traffic jam follow-up function control). Accordingly, an excessive restriction of functionality is prevented, and the merchantability of the vehicle 100 in which the vehicle control apparatus 10 is incorporated is improved.

In this case, as explained with referenced to the setting map 90 of FIG. 3, the travel control in the second control state (traffic jam follow-up function control) is performed by setting the inter-vehicle distance setting with the preceding vehicle to a short setting, or by setting the host vehicle velocity setting to a low setting, in comparison with the travel control in the first control state (ACC control having a traffic jam follow-up function).

In this manner, since the TJA permission flag Ftja is set as long as the power switch 23 is in an ON state even in the case that a learning flag Fys and an ACC permission flag Facc are not set, the travel control in the second control state (traffic jam follow-up function control), which is capable of being executed in a setting in which an inter-vehicle distance setting is short or a host vehicle velocity setting is low, can be carried out. Consequently, it is possible to prevent an excessive restriction of functionality (for example, by making the setting of the TJA permission flag Ftja dependent on the completion of zero point learning, and resetting the TJA permission flag Ftja at a time that the zero point learning process is not yet completed).

Moreover, in the case that the travel control device 28 has detected that the zero point learning process of the yaw rate sensor 52 is completed at a time that the vehicle has stopped during traveling of the vehicle or the like (step S4: YES→step S5: YES), the travel control device 28 cancels suppression of the travel control in the first control state (ACC control having a traffic jam follow-up function).

Immediately upon completion of the learning process of the yaw rate sensor 52, since the travel control in the first control state (ACC control having a traffic jam follow-up function) is enabled, switching can be carried out smoothly from the travel control in the second control state (traffic jam follow-up function control) to the travel control in the first control state (ACC control having a traffic jam follow-up function).

In the vehicle control apparatus 10 according to the present embodiment, the ACC/TJA switch 21 is a dual purpose switch for switching the first control state (ACC control having a traffic jam follow-up function) and the second control state (traffic jam follow-up function control) to an active state or a suppressed state.

In the case it is determined that the ACC/TJA switch 21 serving as the dual purpose switch has been switched to an active state (ON state) (step S8: YES), and when it is determined that the yaw rate sensor 52 has not undergone learning (learning flag Fys=0) (step S5: NO→4 step S4: NO), the travel control device 28 suppresses the travel control in the first control state (ACC control having a traffic jam follow-up function), and permits the travel control in the second control state (traffic jam follow-up function control) (step S9), and therefore, the HMI performance with respect to a vehicle occupant such as the driver or the like is enhanced.

Further, in the case that the ACC/TJA switch 21 serving as the dual purpose switch has been switched to an active state (ON state) (step S8: YES), and when it is determined that the yaw rate sensor 52 has undergone learning {step S5: YES→step S6 (Fys=1)→step S7 (Facc=1)}, as discussed above, if the velocity of the host vehicle 100 (host vehicle velocity) is less than a predetermined velocity, for example, 30 [km/h], then in step S9, the traffic jam follow-up function control may be automatically executed, whereas if the host vehicle velocity is greater than or equal to 30 [km/h], then in step S9, the ACC control having a traffic jam follow-up function may be automatically executed.

Modification 1

According to Modification 1, in order to detect the yaw rate which is a behavior of the vehicle 100, for example, an average yaw rate of the yaw rate detected by the yaw rate sensor 52 and the yaw rate detected by the yaw rate gyro sensor 48 is utilized as the yaw rate, whereby the accuracy of the yaw rate can be improved.

Modification 1 will be described with reference to the flowchart shown in FIG. 4. The process shown in FIG. 4 and the series of processes shown in FIG. 2 coincide with each other, with the exception of the processes of steps S2', S5', and S6'. In this instance, among the processes shown in FIG. 4, only those processes which are different from the processes shown in FIG. 2 will be described.

In the case that the power switch 23 has transitioned from the ON position to the OFF position (step S1: NO), by the stopping process of step S2', the TJA permission flag Ftja, the learning flag Fys of the yaw rate sensor 52, the ACC permission flag Facc, and a learning flag Fgs of the yaw rate gyro sensor 48 are all reset (Ftja=0, Fys=0, Facc=0, Fgs=0).

In step S5', zero point learning of the yaw rate sensor 52 and the yaw rate gyro sensor 48 is carried out and when the zero point learning process of both sensors is completed, then in step S6', the learning flag Fys of the yaw rate sensor 52 and the learning flag Fgs of the yaw rate gyro sensor 48 are set (Fys=1, Fgs=1).

In practice, in step S4: YES, and then in step S5', the learning flag Fys is set when the zero point learning of the yaw rate sensor 52 is completed, and the learning flag Fgs is set separately when the zero point learning of the yaw rate gyro sensor 48 is completed.

In this manner, according to Modification 1, the vehicle sensor is constituted by the yaw rate sensor 52 (first vehicle sensor) and the yaw rate gyro sensor 48 (second vehicle sensor), which are capable of detecting the yaw rate that defines at least one of the same behaviors.

Figure 5A:
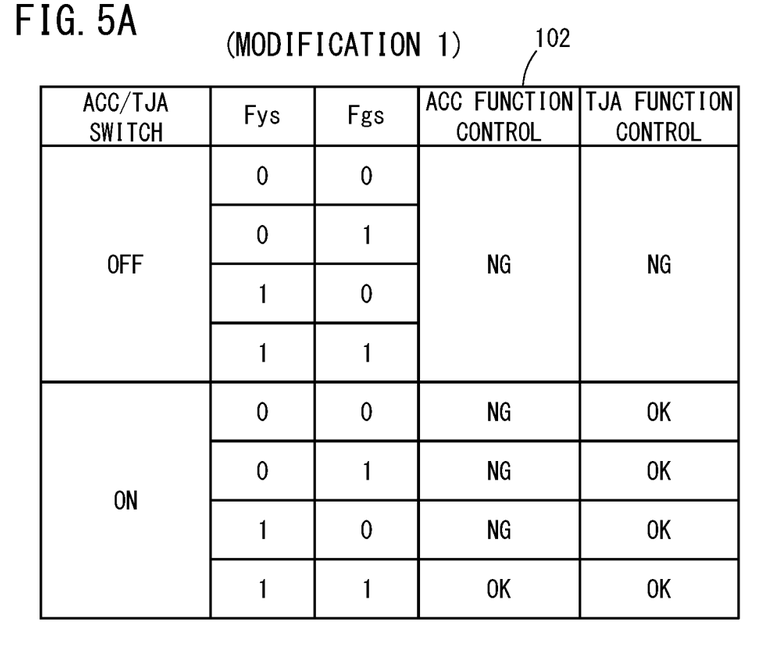
FIG. 5A is a function control map of the vehicle control apparatus according to the first modification.

In step S9, as illustrated in the function control map (function table) 102 shown in FIG. 5A, according to Modification 1, in the case that the vehicle sensors have a redundant design, the ACC/TJA switch 21 is in an ON state, and either one of the yaw rate sensor 52 or the yaw rate gyro sensor 48 has not undergone learning {Step S5': NO→Step S4: NO, with either one of the learning flags Fys, Fgs being reset (to 0)}, the travel control device 28 suppresses the travel control in the first control state (ACC control having a traffic jam follow-up function) (the ACC function control is set to "NG", and the TJA function control is set to "OK" in FIG. 5A), whereas in the case that both the yaw rate sensor 52 and the yaw rate gyro sensor 48 have undergone learning (Fys=1, Fgs=1), the travel control device 28 permits the travel control in the first control state (ACC control having a traffic jam follow-up function) (step S9, the ACC function control is set to "OK" in FIG. 5A). Therefore, during traveling of the vehicle, the vehicle sensors are excellent in terms of adaptability.

Moreover, in the case that the ACC/TJA switch 21 is in an OFF state, regardless of setting or resetting of the learning flags Fys, Fgs, the travel controls in the first control state (ACC control having a traffic jam follow-up function) and the second control state (traffic jam follow-up function control) are suppressed.

Applied Example of Modification 1

In the aforementioned control according to Modification 1, as described with reference to FIGS. 4 and 5A, in the case that the ACC/TJA switch 21 is in an ON state (step S8: YES) with either one of the learning flags Fys, Fgs being in a reset state (Fys=0, Fgs=1 or Fys=1, Fgs=0), the function of the first control state (ACC control having a traffic jam follow-up function) is suppressed (ACC function control: NG).

However, the present invention is not limited to this feature, and it should be noted that the yaw rate sensor 52, which is mounted in the vicinity of the center of gravity of the vehicle 100, and the yaw rate gyro sensor 48, which is mounted in the navigation device 16, are both capable of detecting the yaw rate of the vehicle 100.

In this case, if either one of the learning flags Fys, Fgs is in a set state (Fys=0, Fgs=1 or Fys=1, Fgs=0), or stated otherwise, in the case that the learning process of either one of the yaw rate sensor 52 or the yaw rate gyro sensor 48 has been completed, the deviation (offset) of the zero point of the remaining sensor may be estimated (estimated learning may be performed) on the basis of the sensor value that defines the deviation (offset) of the zero point of the sensor for which learning has been completed.

A correlation exists between the deviation (offset) of the zero point of the yaw rate sensor 52 and the deviation (offset) of the zero point of the yaw rate gyro sensor 48, and if such a correlation is mapped in advance, for example, by referring to the map using a sensor value defining the deviation (offset) of the zero point of the sensor for which learning has been completed, it is possible to estimate (perform estimated learning of) the sensor value that defines the deviation (offset) of the zero point of the remaining sensor.

In this manner, assuming that the learning flags Fys, Fgs are both set by estimating (performing estimated learning of) the deviation (offset) of the zero point of the other vehicle sensor on the basis of the deviation (offset) of the zero point of the one vehicle sensor for which learning has been completed, then in step S9, the configuration may be modified in a manner so as to execute the ACC control having a traffic jam follow-up function.

In the [Applied Example of Modification 1], the vehicle sensors are constituted by the yaw rate sensor 52 as a first vehicle sensor, and the yaw rate gyro sensor 48 as a second vehicle sensor, which are capable of detecting at least one of the same behaviors.

In addition, in the case that the travel control device 28 has detected that the detection accuracy of either one of the yaw rate sensor 52 (the first vehicle sensor) or the yaw rate gyro sensor 48 (the second vehicle sensor) is greater than or equal to a predetermined accuracy, for example, in the case that either one of the learning flags Fys or Fgs has indicated completion of learning, then since it is possible to calibrate (estimate learning of) the sensor for which learning has not yet been completed, on the basis of the sensor value reflecting a learned value of the vehicle sensor for which learning has been completed, regardless of whether the vehicle 100 is stopped or whether the vehicle 100 is traveling, it is possible to promptly increase the detection accuracy of both of the sensors, and to suppress an excessive restriction of functionality.

Modification 2

Figure 6:
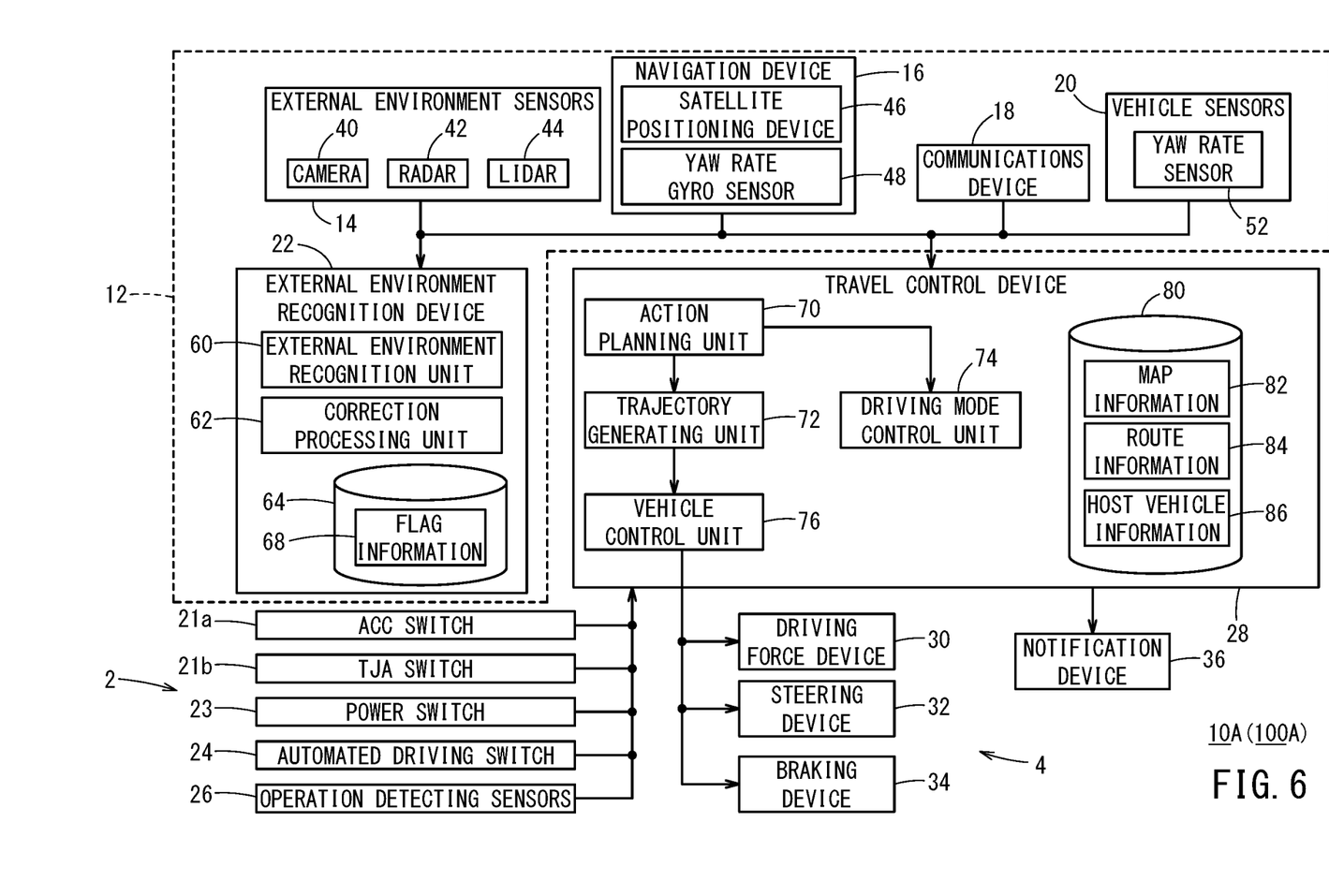
FIG. 6 is a block diagram showing a configuration of a vehicle equipped with a vehicle control apparatus according to the second modification.

In a vehicle 100A in which there is incorporated a vehicle control apparatus 10A according to Modification 2 shown in FIG. 6, in comparison with the vehicle 100 in which the vehicle control apparatus 10 shown in FIG. 1 is incorporated, a single ACC/TJA switch 21 is provided separately from an ACC switch 21a and a TJA switch 21b to thereby enhance an HMI property of a user such as the driver or the like.

Figure 2:
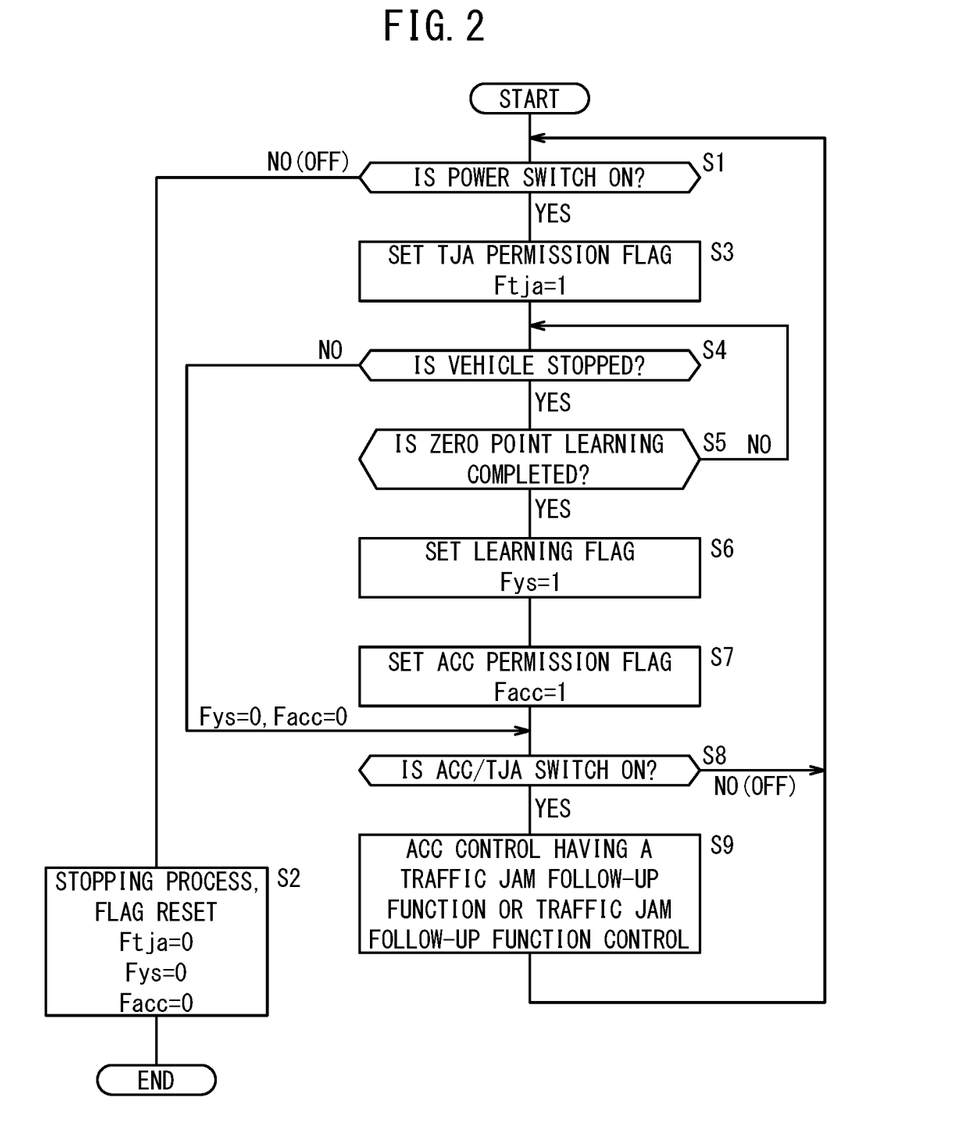
FIG. 2 is a flowchart for explaining operations of the vehicle control apparatus according to the embodiment.
Figure 4:
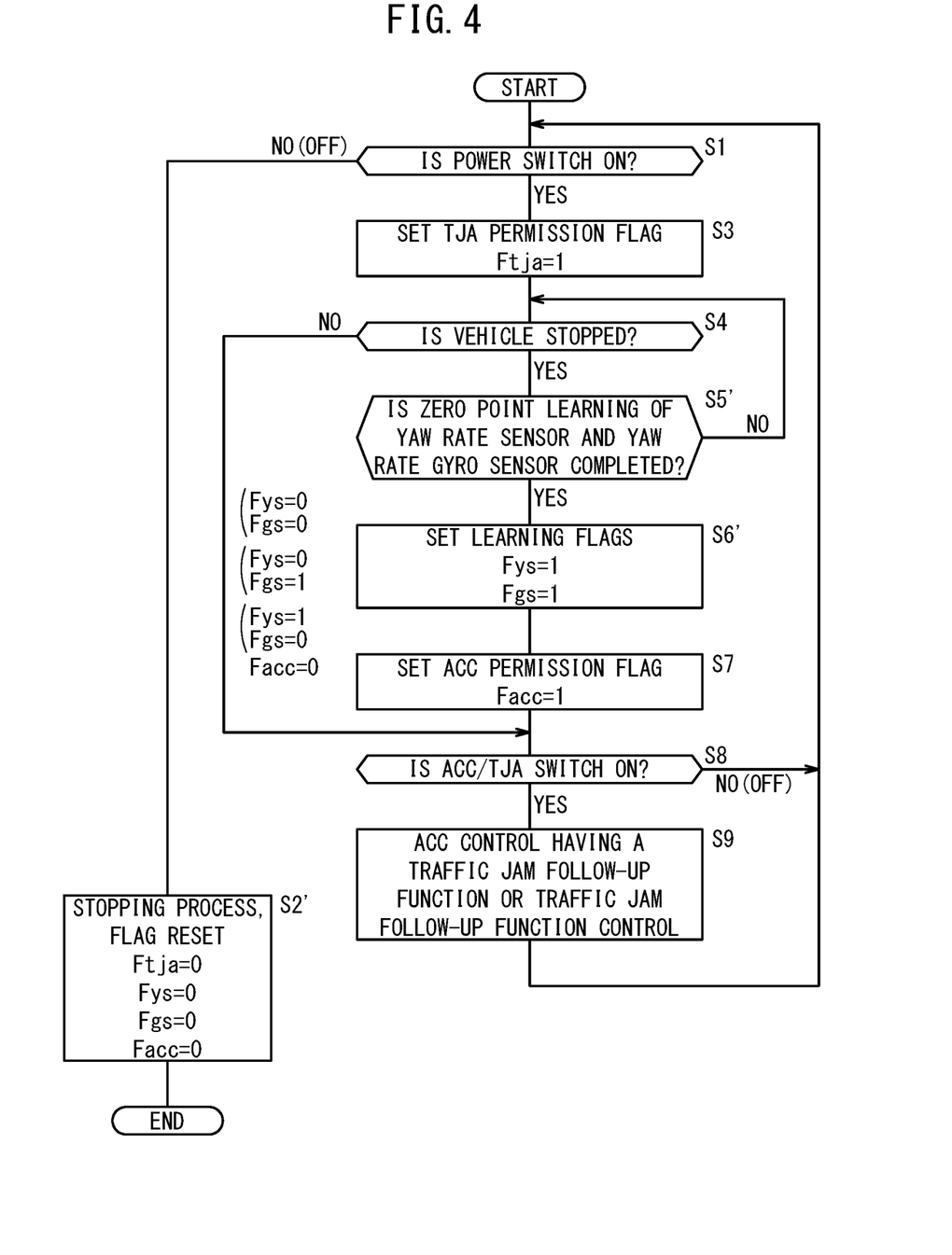
FIG. 4 is a flowchart for explaining operations of the vehicle control apparatus in accordance with a first modification.

In Modification 2, the process of step S8 is changed in the flowchart of FIG. 2 or the flowchart of FIG. 4.

Figure 7:
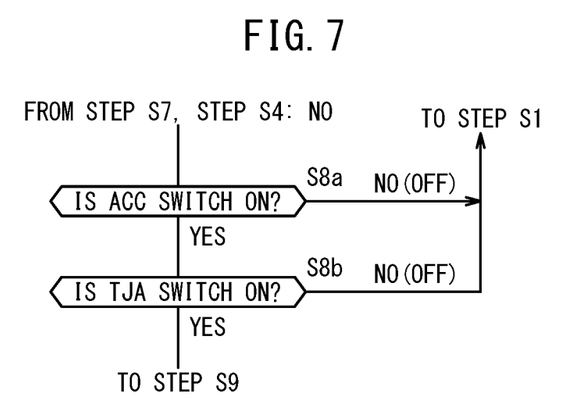
FIG. 7 is a flowchart for explaining operations of the vehicle control apparatus in accordance with the second modification.

FIG. 7 is a flowchart for describing the process of Modification 2. In this instance, other processes thereof coincide with those in the flowchart shown in FIG. 2.

In step S8a, a determination is made as to whether the ACC switch 21a is in an ON state or an OFF state, and furthermore, in step S8b, a determination is made as to whether the TJA switch 21b is in an ON state or an OFF state.

Figure 5B:
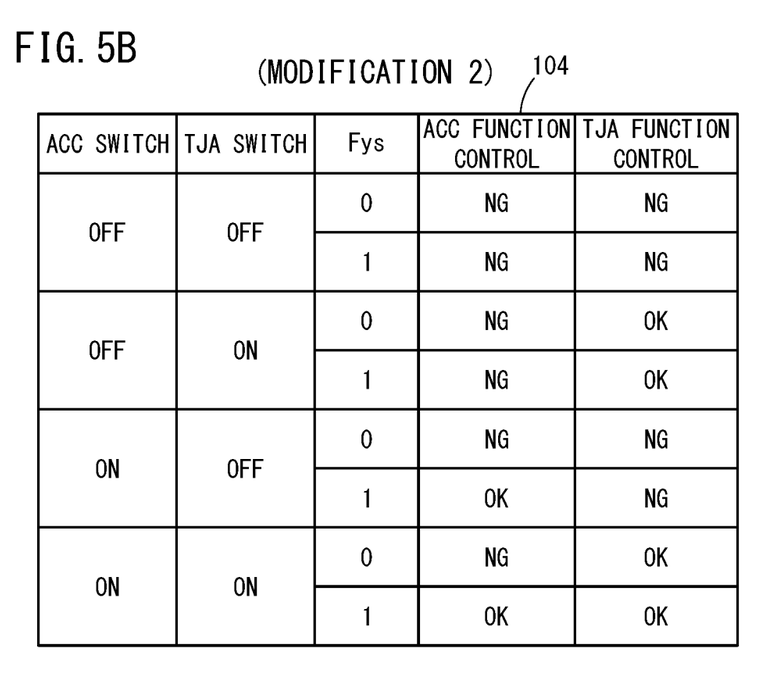
FIG. 5B is a function control map of the vehicle control apparatus according to a second modification.

In step S9 (see FIG. 4), as shown in the function control map (function table) 104 illustrated in FIG. 5B according to Modification 2, in the case it is determined that the yaw rate sensor 52 has not undergone learning (Fys=0), even if the ACC switch 21a has been switched to an ON state, the switching operation is invalidated, and the ACC function control is suppressed, and in this case, switching of the TJA switch 21b to an ON state is set as a condition (the switching operation is validated) and only the TJA function control is permitted. Since the ACC switch 21a and the TJA switch 21b are separately provided, the HMI property with respect to the user is enhanced.

The vehicle control apparatus according to the present invention is not limited to the embodiment described above, and it is a matter of course that various modified or additional configurations could be adopted therein without deviating from the essence and gist of the present invention.

For example, the present invention is not limited to the yaw rate sensor 52, but may be applied to other vehicle sensors that detect the behavior of the host vehicle 100, such as an acceleration sensor, a steering angle sensor, or the like.

Further, in the case that the ACC function control and/or the TJA function control has been suppressed even though the ACC/TJA switch 21, the ACC switch 21a, and the TJA switch 21b have been operated from an OFF state to an ON state, the reason therefor is preferably notified to the user through the notification device 36. By providing a notification in this manner, it is made possible for the vehicle control apparatus 10, 10A to possess a user friendly HMI property.

What is claimed is:

1. A vehicle control apparatus, comprising:
   a vehicle sensor adapted to detect a behavior of a host vehicle;
   an external environment sensor adapted to acquire external environmental information around a periphery of the host vehicle; and
   a travel control device adapted to control traveling of the host vehicle in a first control state and a second control state, in a manner so that the host vehicle conforms to the external environmental information on the basis of a behavior of the host vehicle;
   wherein,
   the vehicle sensor is constituted by a first vehicle sensor and a second vehicle sensor which are capable of detecting at least one of the same behaviors; and
   in the case it is detected that a detection accuracy of either one of the first vehicle sensor or the second vehicle sensor is less than a predetermined accuracy, the travel control device suppresses the travel control in the first control state, and in the case that the detection accuracy of both the first vehicle sensor and the second vehicle sensor is greater than or equal to a predetermined accuracy, the travel control device permits traveling in the first control state.

2. The vehicle control apparatus according to claim 1, wherein the travel control in the second control state is performed by limiting an inter-vehicle distance setting with a preceding vehicle to a short setting, or by limiting a host vehicle velocity setting to a low setting, in comparison with the travel control in the first control state.

3. The vehicle control apparatus according to claim 1, wherein:
   in the case it is detected that the detection accuracy of either one of the first vehicle sensor or the second vehicle sensor is greater than or equal to a predetermined accuracy, the travel control device makes use of a remaining one of the vehicle sensors whose detection accuracy is unknown, using the detection value of the vehicle sensor whose detection accuracy was detected to be greater than or equal to the predetermined accuracy.

4. The vehicle control apparatus according to claim 1, further comprising:
a first switch adapted to switch the first control state to an active state or a suppressed state; and
a second switch adapted to switch the second control state to an active state or a suppressed state;
wherein, in the case it is determined that the vehicle sensor has not undergone learning, the travel control device invalidates a switching operation of the first switch, validates a switching operation of the second switch, and permits only the travel control in the second control state.

5. The vehicle control apparatus according to claim 1, further comprising:
a dual purpose switch adapted to switch the first and second control states to an active state or a suppressed state; and
wherein, in the case it is determined that the dual purpose switch has been switched to the active state, and when it is determined that a detection accuracy of the vehicle sensor is less than a predetermined accuracy, the travel control device suppresses the travel control in the first control state, and permits the travel control in the second control state.

6. The vehicle control apparatus according to claim 1, wherein the first control state is an ACC control having a traffic jam follow-up function, and the second control state is a traffic jam follow-up function control.

7. A vehicle control apparatus, comprising:
a vehicle sensor adapted to detect a behavior of a host vehicle;
an external environment sensor adapted to acquire external environmental information around a periphery of the host vehicle; and
a travel control device adapted to control traveling of the host vehicle in a first control state and a second control state, in a manner so that the host vehicle conforms to the external environmental information on the basis of a behavior of the host vehicle; wherein,
the vehicle sensor is constituted by a first vehicle sensor and a second vehicle sensor which are capable of detecting at least one of the same behaviors; and
in the case it is detected that the detection accuracy of either one of the first vehicle sensor or the second vehicle sensor is greater than or equal to a predetermined accuracy, the travel control device makes use of a remaining one of the vehicle sensors whose detection accuracy is unknown, using the detection value of the vehicle sensor whose detection accuracy was detected to be greater than or equal to the predetermined accuracy.

8. The vehicle control apparatus according to claim 7, wherein the travel control in the second control state is performed by limiting an inter-vehicle distance setting with a preceding vehicle to a short setting, or by limiting a host vehicle velocity setting to a low setting, in comparison with the travel control in the first control state.

9. The vehicle control apparatus according to claim 7, further comprising:
a first switch adapted to switch the first control state to an active state or a suppressed state; and
a second switch adapted to switch the second control state to an active state or a suppressed state;
wherein, in the case it is determined that the vehicle sensor has not undergone learning, the travel control device invalidates a switching operation of the first switch, validates a switching operation of the second switch, and permits only the travel control in the second control state.

10. The vehicle control apparatus according to claim 7, further comprising:
a dual purpose switch adapted to switch the first and second control states to an active state or a suppressed state; and
wherein, in the case it is determined that the dual purpose switch has been switched to the active state, and when it is determined that a detection accuracy of the vehicle sensor is less than a predetermined accuracy, the travel control device suppresses the travel control in the first control state, and permits the travel control in the second control state.

11. The vehicle control apparatus according to claim 7, wherein the first control state is an ACC control having a traffic jam follow-up function, and the second control state is a traffic jam follow-up function control.

12. A vehicle control apparatus, comprising:
a vehicle sensor adapted to detect a behavior of a host vehicle;
an external environment sensor adapted to acquire external environmental information around a periphery of the host vehicle; and
a travel control device adapted to control traveling of the host vehicle in a first control state and a second control state, in a manner so that the host vehicle conforms to the external environmental information on the basis of a behavior of the host vehicle;
a first switch adapted to switch the first control state to an active state or a suppressed state; and
a second switch adapted to switch the second control state to an active state or a suppressed state;
wherein, in the case it is determined that the vehicle sensor has not undergone learning, the travel control device invalidates a switching operation of the first switch, validates a switching operation of the second switch, and permits only the travel control in the second control state.

13. The vehicle control apparatus according to claim 12, wherein the travel control in the second control state is performed by limiting an inter-vehicle distance setting with a preceding vehicle to a short setting, or by limiting a host vehicle velocity setting to a low setting, in comparison with the travel control in the first control state.

14. The vehicle control apparatus according to claim 12, wherein the first control state is an ACC control having a traffic jam follow-up function, and the second control state is a traffic jam follow-up function control.

* * * * *